United States Patent [19]
Mulder

[11] B 3,925,634
[45] Dec. 9, 1975

[54] PROCESS FOR WELDING A CLADDING ONTO A BASE MATERIAL

[75] Inventor: Jan Pieter Fokke Mulder, Rotterdam, Netherlands

[73] Assignee: De Rotterdamsche Droogdok Maatschappij B.V., Rotterdam, Netherlands

[22] Filed: June 7, 1972

[21] Appl. No.: 260,455

[44] Published under the Trial Voluntary Protest Program on January 28, 1975 as document no. B 260,455.

[30] Foreign Application Priority Data
June 10, 1971 Netherlands.................... 7107977

[52] U.S. Cl.................................. 219/76; 219/137
[51] Int. Cl.² .......................................... B23K 9/04
[58] Field of Search .......... 219/137, 73, 76, 77, 74, 219/136

[56] References Cited
UNITED STATES PATENTS

| | | | |
|---|---|---|---|
| 1,554,546 | 9/1925 | Austin.................. | 219/137 |
| 2,416,379 | 2/1947 | Colta .................... | 219/76 |
| 2,427,350 | 9/1947 | Carpenter et al....... | 219/76 |
| 3,019,327 | 1/1962 | Engel..................... | 219/76 |
| 3,139,511 | 6/1964 | Kudelko................. | 219/76 |
| 3,692,590 | 9/1972 | Godai et al............. | 219/73 |

FOREIGN PATENTS OR APPLICATIONS
1,188,995   4/1970   United Kingdom.................. 219/76

OTHER PUBLICATIONS
"New Techniques For Cladding" Welding Journal, December 1960, pp. 1222-1229.

*Primary Examiner*—J. V. Truhe
*Assistant Examiner*—Clifford C. Shaw
*Attorney, Agent, or Firm*—Fleit & Jacobson

[57] ABSTRACT

A process for welding a protective cladding onto a steel base plate having a coarse-grained structure upon being heated to a given temperature. A first, comparatively thin layer of cladding material which does not have a coarse-grained structure upon being heated to said given temperature is welded onto the base plate. The heat input to the base plate is controlled during the welding so that a zone of coarse-grained structure is formed in the base plate immediately below the first layer. A second, comparatively thick layer of cladding material is then welded onto the first layer and the heat input to the base plate is controlled so that the coarse-grained structure in the base plate is completely transformed into a fine-grained structure and so that the temperature at which a coarse-grained structure is formed in the base plate is not reached in the base plate.

3 Claims, 2 Drawing Figures

PROCESS FOR WELDING A CLADDING ONTO A BASE MATERIAL

The present invention relates to a process for welding a cladding onto a base material, e.g., the internal plating of pressure vessels by submerged arc welding of stainless steel strips. In doing so, a e.g., helical cladding structure will be formed on the inside wall of the vessel, the individual windings of which will butt against each other with their edges and are welded to each other in a manner that they will partly overlap each other.

Figure 1:
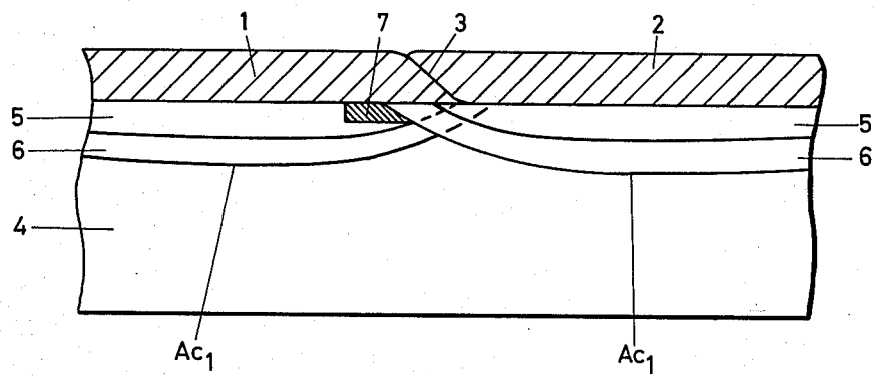

FIG. 1 illustrates a cross-sectional area of part of such a known cladding and the base material, perpendicular to the surface and perpendicular to the direction of welding. Reference numerals 1 and 2 indicate two beads of stainless steel, butting against each other at reference numeral 3 and partly overlapping each other. Said beads have been welded one after another to the surface of the base material 4.

It has now appeared that in a number of cases microscopic intercrystalline cracks may occur in the base material, i.e., in the hatched area 7, lying below the beads 1 and 2 which overlap each other partly. These intercrystalline cracks can be shown by removing the cladded strips as well as part of the surface of the base material and by grinding the surface thus released which, therefore, runs parallel to the original surface, and by subjecting said surface to a magnetic particle test for crack examination. It appears that the intercrystalline cracks occur mainly in a direction perpendicular to the longitudinal direction of the beads and, therefore, also perpendicular to the direction of welding and, moreover, only in the hatched area 7 shown in FIG. 1 at the left side below the overlap 3. These cracks may occur in different kinds of material, both in forged plates and in rolled plates.

Generally, the heat treatment is such that the base material is quenched and tempered before the welding and that after the welding an annealing process takes place at a minimum temperature of 600°C in order to lower the stress level. It appeared that there was no correlation between the formation of cracks and the direction of rolling of the base plate or its thickness.

In addition, FIG. 1 illustrates two heat ranges 5 and 6 in the base material, said ranges occur below each bead during the cladding of the strips. The extended lines form isotherms which indicate the limits of these ranges which become visible after an etching process of the surface of the transversely sectioned base material. During the strip welding the area 5 has reached a temperature in which it has been completely austenitized and in which a coarse-grained structure occurs, whereas the area 6 has been partly austenitized and is showing a fine-grained structure.

In horizontal direction, the area 7 in which the intergranular cracks occur, will run the length of about 10 mm from the line $A_{c1}$ below the bead 2, said line extending partly to below the bead 1. In vertical direction, the distances along which the cracks extend amounts to a maximum of 2.5 mm from the surface of the base material. This applies to a clad thickness of the beads 1 and 2 of approximately 5 mm, at a welding speed of approximately 10 cm per minute.

After a continued examination it was possible to show that said cracks occur during the annealing process as abovementioned at a minimum temperature of 600°C, and that, moreover, the presence of a coarse-grained structure, the occurrence of mechanical and thermal stresses, as well as a minimum annealing time, are necessary. These conditions all apply in the area 7. It appeared that the cracks did not occur in the remaining part of the area 5 and not in the area 6 either.

As the base material at the region of the cladded strip is always partly melting, a coarse-grained structure is not avoidable. The occurrence of mechanical and thermal stresses might be avoided with the aid of special heat treatment techniques. As appeared from experiments, one should take care that the temperature interval in which the formation of cracks may occur, will be passed fast. However, this is in practice not possible with furnaces, as on account of the in general considerable thickness of the base material an excessive amount of heat has to be supplied, as a consequence of which the heat treatment time becomes uneconomically long and the temperature will rise too slow. Also the use of a special welding current, special welding are voltages and the variation of the sequence during the welding of the beads did not give a solution of the problem.

The present invention now provides a process in which the formation of the intercrystalline cracks is avoided, said process is characterized by that first a thin layer is being welded at a comparatively high welding speed and with a comparatively low heat input and that subsequently a second layer is welded on said first layer with a heat input and at a welding speed in such a way that in the area with coarse-grained structure which has been formed in the base material during the cladding of the first layer, such conditions of temperature occur during the cladding of the second layer that the material will be recrystallized completely and will obtain a fine grained-structure, and that the temperature range in which a coarse-grained structure would occur during the cladding of the second layer, will lie entirely in the first cladded layer.

Figure 2:
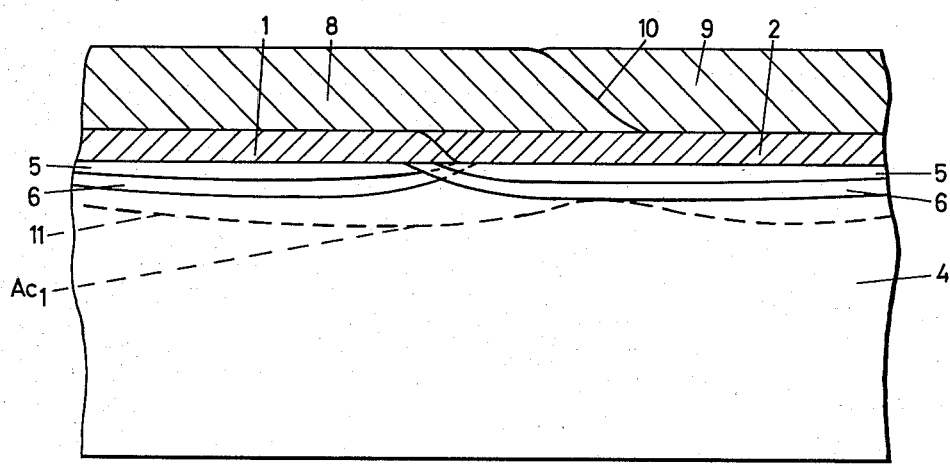

FIG. 2 illustrates a corresponding cross-sectional area, obtained during the process in accordance with the invention, and being perpendicular to the direction of welding and the surface, as indicated in FIG. 1. The reference numerals 1 up to 6 inclusive indicate corresponding parts and areas as shown in FIG. 1.

Two other thicker beads 8 and 9 with an overlapping portion 10 have now been welded on the first thin beads 1 and 2. The position of this overlap is of no importance as long as the $A_{c1}$ isotherm 11, belonging to the second cladded layer, lies below the isotherm indicating the limit between the areas 5 and 6, which result from welding the first layer. In that case, the coarse-grained area 5 is re-crystallized completely by the amount of heat supplied by the cladding of the second layer and no intercrystalline cracks occur any longer even during the stress relieving process. Surprisingly, it has therefore appeared that the cladding of a second layer may create ideal conditions for the re-crystallization of the coarse-grained area below the first layer, because in doing so, and contrary to the process during the normal re-annealing, the temperature interval during which the formation of cracks may occur, will be passed at a speed which is sufficiently high.

For the process in accordance with the invention, various tests were carried out, in which very favourable results were obtained. The width of both the first cladded strip and the second cladded strip amounted to 60 mm. The thickness of the first layer could vary between approximately 2 mm and 3.5 mm, whereas the thickness of the second layer amounted to approximately 4.5 to 5 mm. The first and second layers were submerged arc welded at a speed of 16 cm and 11 cm per minute, respectively.

During the cladding of the first layer a shallow coarse-grained area was formed, which was always completely recrystallized during the cladding of the second layer.

It may be stated in general, that when using strips with a width of 60 mm and a thickness of 0.5 mm good results are attainable with welding currents for the first layer between approximately 600 and 650 Amp. (approximately 20 Amp/mm$^2$) with an arc voltage between approximately 29 and 31 Volt and at a welding speed between 14 and 20 cm per minute, either with or without preheating of the base material. The second layer may be cladded with a current of approximately 600 Amp (about 20 Amp/mm$^2$) and a voltage of approximately 31 Volt at a welding speed between 10 and 20 cm per minute, without pre-heating of the base material.

It is a matter of course that the invention is not limited to the above-mentioned numerical examples. Even with varying values, the conditions may be chosen so that after the welding a fine structure is always present in the base material, as a results of which the risk of intercrystalline crack formation is avoided. To this end, only the measures as stated in the claim 1 following hereafter, should be carried out.

Moreover, the invention is not limited to the cladding of strips of stainless steel or other materials either. Also wires may be welded-on and, in general, the invention applies to workpieces in which the conditions occur which have been described in the beginning, in which a coarse- grained area is exposed to mechanical and thermal stresses.

As to the manufacturing of high-pressure-vessels, the invention is also applicable to the joints between the rings from which in general pressure vessels of that kind are built up by welding these rings to each other. Application is also possible with nozzles for pressure vessels.

I claim:

1. A process for welding a cladding onto a steel base material, the process comprising the steps of: cladding a first thin buffer layer of stainless steel cladding material onto said base material at a first welding speed and at a first welding temperature so that a region of said base material, near the cladded surface thereof, is austenitized to the extent that a course-grained region is developed; and cladding a second layer of stainless steel cladding material onto said first thin layer of cladding material at a second welding speed and a second welding temperature so that said course-grained region of base material is recrystallized to the extent that it is converted to a fine-grained region, and so that the temperature conditions which resulted in the development of the course-grained region of base material during the cladding of the first thin layer of cladding material are restricted to the boundaries of said first thin layer of cladding material.

2. The process of claim 1, wherein said first thin layer of cladding material has a thickness of between approximately 2 and 3.5 mm. and wherein said first welding speed is between approximately 14 and 20 cm. per minute, with a current density of approximately 20 Amp. per mm.$^2$ and with an arc voltage between approximately 29 and 31 Volts.

3. The process of claim 1, wherein said second layer of cladding material has a thickness of between approximately 4.5 and 5 mm., and wherein said second welding speed is between approximately 10 and 20 cm. per minute, with a current density of approximately 20 Amp. per mm.$^2$ and with an arc voltage of approximately 31 Volts.

* * * * *